United States Patent [19]

Lynn

[11] 4,430,446

[45] Feb. 7, 1984

[54] PLASTICS FOAM PRODUCTION

[76] Inventor: Kenneth C. Lynn, 34 Gilhams Ave., Banstead, Surrey, England

[21] Appl. No.: 443,040

[22] Filed: Nov. 19, 1982

Related U.S. Application Data

[63] Continuation-in-part of Ser. No. 331,800, Dec. 12, 1981, abandoned, which is a continuation of Ser. No. 90,988, Nov. 5, 1979, abandoned.

[30] Foreign Application Priority Data

Nov. 6, 1978 [GB] United Kingdom ............... 43298/78

[51] Int. Cl.³ .................. C08G 18/14; B01F 3/04; B01F 5/06
[52] U.S. Cl. ............................. 521/50; 521/131; 521/917; 521/113; 521/99; 261/129; 261/DIG. 26
[58] Field of Search ................. 521/917, 50, 113, 99, 521/131

[56] References Cited

U.S. PATENT DOCUMENTS

| | | | |
|---|---|---|---|
| 2,928,130 | 3/1960 | Gray | 521/917 |
| 3,118,958 | 1/1964 | White | 521/917 |
| 3,186,959 | 1/1965 | Shriver et al. | 521/917 |
| 3,220,801 | 11/1965 | Rill et al. | 521/917 |
| 3,377,139 | 4/1968 | MacGregor et al. | 521/917 |
| 3,486,862 | 12/1969 | Unterstenhoefer | 521/917 |

OTHER PUBLICATIONS

Knox–Chemical Engineering Progress, vol.-57, No. 10, Oct. 1961, pp. 40–47.

Primary Examiner—Maurice J. Welsh
Assistant Examiner—Marvin L. Moore

[57] ABSTRACT

Disclosed is a method for forming pre-froth plastics foam which comprises the steps of mixing the plastics components with a volatile liquid under pressure, causing the mixture to flow to a point of use, and maintaining a series of controlled pressure drops by means of present automatic valves or by passive means such as orifice plates. Typical foams are polyurethane and phenolic.

10 Claims, 6 Drawing Figures

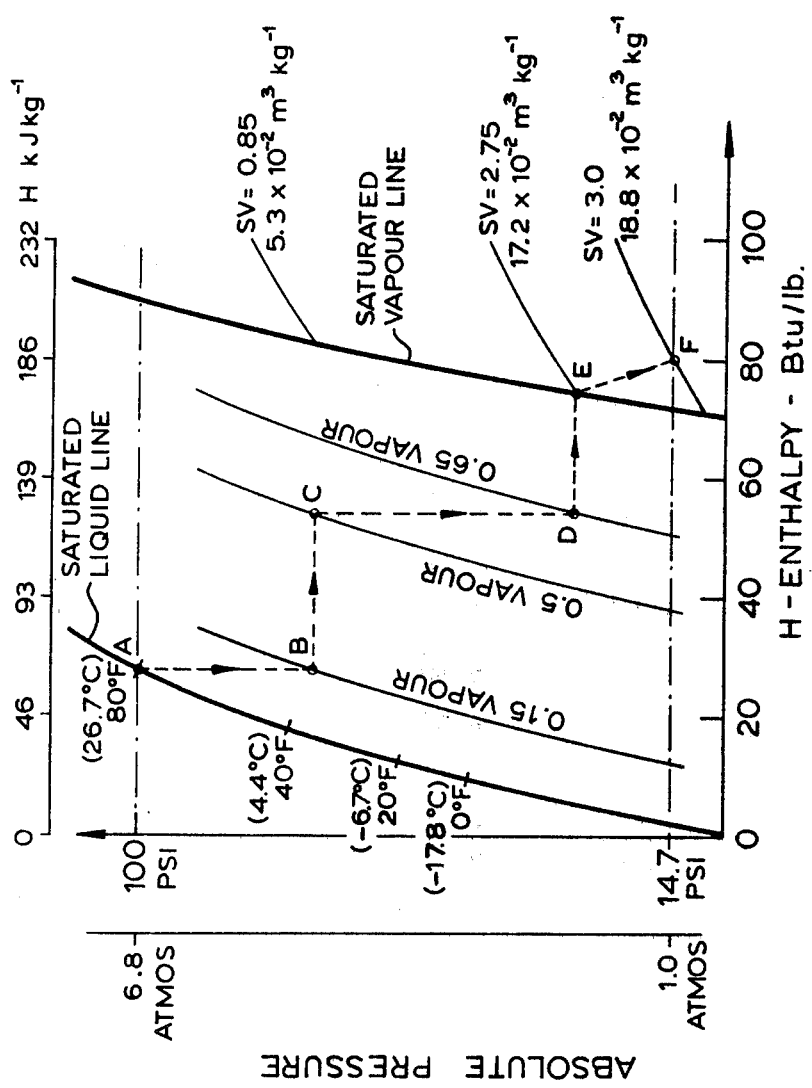

PLASTICS FOAM PRODUCTION

INTRODUCTION

This invention relates to methods for making plastics foams. This application is a continuation-in-part of application Ser. No. 331800 filed Dec. 12th, 1981, now abandoned, which is a continuation of application Ser. No. 90988 filed Nov. 5th, 1979, now abandoned.

BACKGROUND OF THE INVENTION

Plastics foam is now commonly produced by in situ methods whereby the gas or frothing agent is generated during the polymerisation process. The chemical components in liquid form are mixed together, generally by mechanical means, and then whilst still in the liquid stage and prior to any appreciable reaction taking place are injected into the mould or cavity to be filled. Foaming then takes place within the mould or cavity and involves volumetric change up to 30 fold according to the density required and the degree of under- or overpacking induced by design.

In situ foaming has a number of disadvantages, the principal ones being that the foam so produced is anisotropic in its strength properties, high internal mould pressures are often created and perfect filling, especially in complex cavities, is difficult to achieve.

Pre-froth foam on the other hand, i.e. foam which is first produced and then injected or placed as foam in the mould or cavity, should in theory be much more isotropic in nature, generate much less pressure and, because of its free-flow characteristics, make perfect filling of complex cavities much easier.

Pre-frothing is discussed in the article "Frothing" by R. E. Knox ('Chemical Engineering Progress', Vol. 57, No. 10, Oct. 1961). It has hitherto been difficult with pre-frothing to control quality and density and to obtain reproducibility.

The principle of pre-frothing is to use a low boiling point liquid, normally a fluorocarbon (refrigerant) as the gas-producing agent. Unlike the in situ foam process, where gas production is in proportion to the rate of polymerisation, the fluorocarbon flashes off into a gas almost instantaneously following a rapid pressure drop.

This semi-explosive nature of its change of state from liquid to gas tends to shear the viscous plastic cell walls giving rise to the phenomena known as gas break-out. Having once broken out from the boundaries of a viscous mass the gas cannot satisfactorily be induced back into it. Gas break-out makes metering the correct quantity of fluorocarbon meaningless and therefore control of density, quality and reproducibility becomes impossible.

The invention has for its object to provide method and apparatus for pre-frothing which avoids gas break-out, and which enables control of density and quality.

SUMMARY OF THE INVENTION

The invention provides in one aspect a method of forming pre-froth plastics foam which comprises the steps of:

mixing the plastics component with a volatile liquid under a pressure sufficient to maintain the volatile liquid in a volatile state;

causing the mixture to flow to a point of use;

maintaining in a first region through which the flow passes a first pressure such that at the temperature prevailing a small but effective quantity of the liquid volatilizes to form vapour bubbles providing nuclei;

causing the flow after passing said first region to undergo a pressure drop to cause volatilization of some but not all of the remaining liquid; and maintaining in a second region through which the flow passes after the pressure drop a second pressure lower than the first and allowing volatilization of further liquid in said second region.

A preferred method according to the invention includes the further steps of causing the flow to undergo a second pressure drop to cause further volatilization of volatile liquid, and maintaining in a third region through which the flow passes after the second pressure drop a third pressure lower than the second and allowing volatilization of further liquid in said third region. The flow can be conducted through additional pressure drops, each inducing volatilization and each followed by a region in which pressure is maintained and further volatilization occurs.

The pressure drops can be brought about by valves controlled in accordance with pressure in the flow, or by passive means such as orifice plates.

In a further aspect the invention provides a method of forming a pre-froth plastics foam which comprises:

mixing the plastics component with a volatile liquid under a pressure sufficient to maintain the liquid in a volatile state;

causing the mixture to flow to a point of use;

maintaining in a first region through which the flow passes a first pressure such that at the temperature prevailing a small but effective quantity of the liquid volatilizes to form vapour bubbles providing nuclei;

causing the flow after passing said first region to undergo a substantially adiabatic pressure reduction to a second pressure substantially lower than the first pressure volatilization of some but not all of the liquid resulting from the pressure drop and volatilization of further liquid resulting from its absorption of latent heat from the plastics component.

The invention is of general application, applying both to exothermic and endothermic reactions, to thermoplastic and thermosetting resins. Two examples of very different materials are given below. The method of the invention has to be adapted to the particular plastics material chosen for foaming and the examples will help to show how this is done and the sort of considerations that will apply generally.

The invention includes also apparatus for carrying out the method.

The amount of the liquid volatilized in the first region is preferably 1–2%.

The accompanying drawings illustrate two preferred embodiments of the invention for producing polyurethane foam, and a further example in which the invention is applied to the production of phenolic resin foam.

BRIEF DESCRIPTION OF THE DRAWINGS

In the drawings:

FIG. 2 is a pressure-enthalpy diagram illustrating a first producing process for producing polyurethane foam.

DESCRIPTION OF PREFERRED EMBODIMENTS

Figure 3:
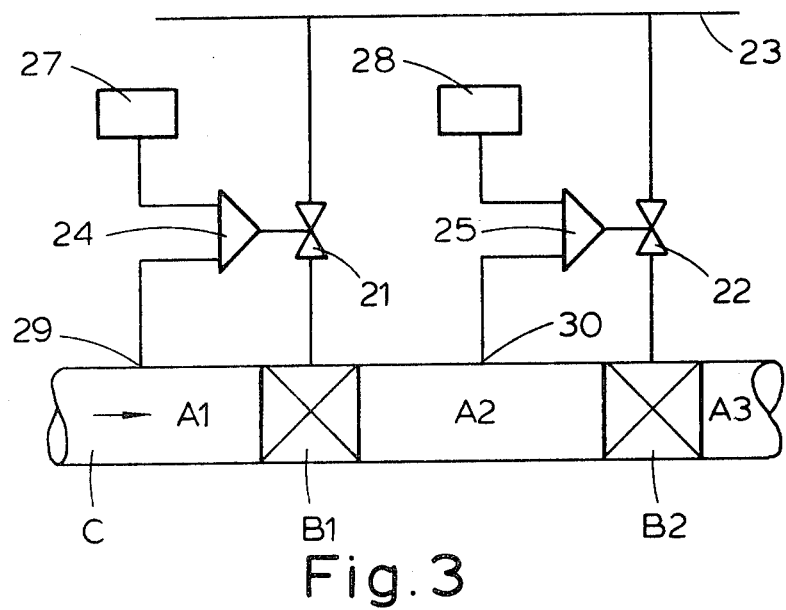
FIG. 3 is a diagram of apparatus for use in the first process.

Referring first to FIG. 3, in a mixing unit (not shown) there is mixed under pressure resin blend, isocyanate and fluorocarbon refrigerant liquid such as that sold by I.C.I. under the Registered Trade Mark ARCTON 12. (A similar product is sold under the Trade Mark FREON). Suitable proportions are, for example, 100 parts by volume resin blend, 100 parts by volume isocyanate, 16 parts by volume ARCTON, producing a product of 6 lbs./cu.ft. (95 kg./cu.meter) density. The mixture is caused to flow in the direction of the arrow through a conduit C from the mixing unit to a point of utilisation (also not shown) providing back pressure.

Two diaphragm-operated pressure control and reduction valves B1, B2 are arranged in the conduit C defining three regions A1, A2, A3 in each of which the pressure is held approximately constant by valve control means sensing pressure at A1, A2 and operating the valves. Various known means are suitable for this purpose, one arrangement being shown by way of example.

In this example each valve B1, B2 is controlled by an operator 21, 22 respectively deriving power from a pressure line 23. Each operator 21, 22 is controlled by a differential fluid amplifier 24, 25 receiving inputs from a set pressure regulator 27, 28 and a connection to the conduit C upstream of the respective valve at 29, 30.

The initial temperature of the mix is chosen on the basis of the temperature desired for the foam emerging from the apparatus and the corresponding specific volume of the gas content which in turn controls the final density of the foam. The required temperatures of the mix components are likewise pre-calculated and established having in mind the thermodynamic enthalpy requirement of the overall process.

Figure 1:
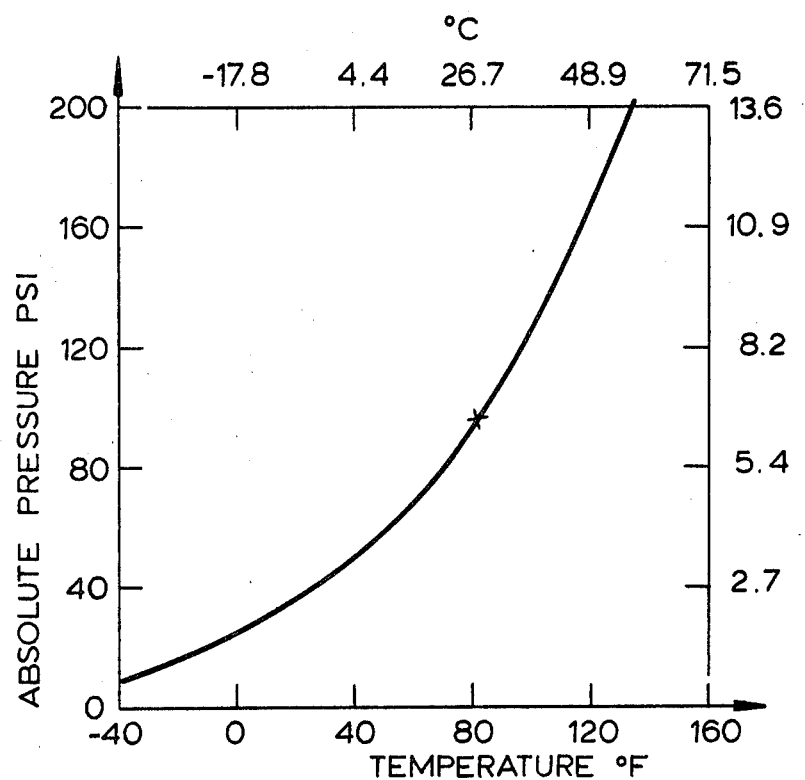
FIG. 1 is a pressure temperature curve for the volatile liquid used.

The pressure for the region A1 is chosen by reference to the pressure-temperature curve for the fluorocarbon (FIG. 1) to be such as to generate nucleating gas in this region to the extent of 1.5%, of the available fluorocarbon. As shown this pressure is 100 p.s.i. (6.8 atmospheres) at a temperature of 80° F. (26.7° C.)

At a valve B1 a pressure drop of 50 p.s.i. (3.4 atmospheres) causes 15% gas formation very rapidly. This gas tends to attach itself to the nuclei previously formed. The pressure reduction also adiabatically reduces the temperature of the fluorocarbon causing a temperature differential with the chemical mix.

In the region A2 further gasification occurs, to the extent of 50% of the liquid present, by reason of the liquid gaining in latent heat from the sensible heat of the resin and isocyanate.

At valve B2 a further pressure drop to atmospheric gives a further 15% volatilization, with corresponding adiabatic cooling, and the remaining liquid volatilizes in the region A3 ending in a superheated condition. FIG. 2 shows a plot (represented by chain lines A B C D E F) of the progress and shows the manner in which the change of state occurs.

Figure 4:
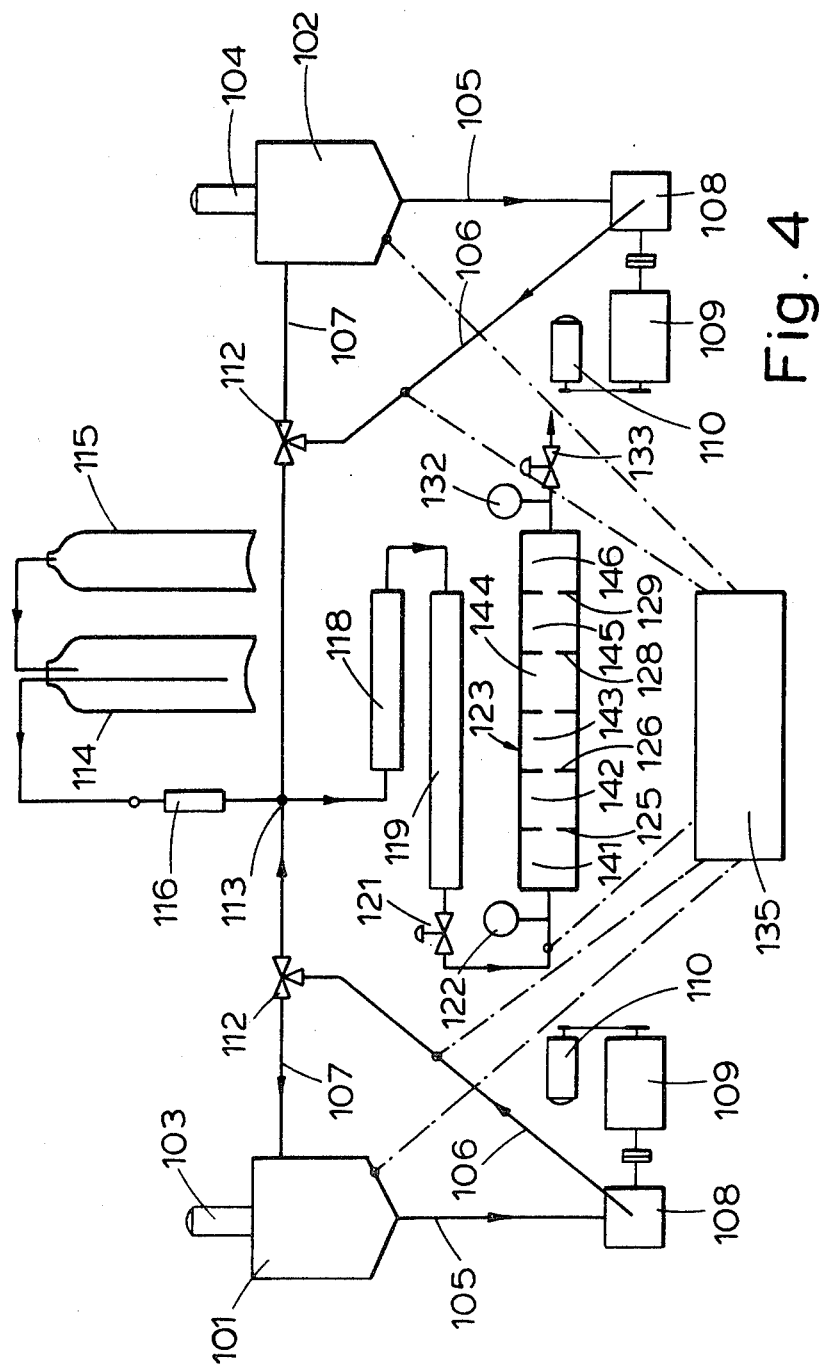
FIG. 4 is a diagram of apparatus for use as a second process for producing polyurethane foam.

FIG. 4 illustrates diagrammatically a second form of apparatus for producing polyurethane foam. The resin and isocyanate components are held in separate tanks 101, 102 at predetermined temperatures and constantly stirred by stirrer motors 103, 104. Continuous circulation of each component is maintained through a respective closed circuit 105, 106, 107 by means of constant volume displacement pumps 108 driven by motors 109 having controllers 110, there being one pump-motor controller unit for each component. Each of the closed circuits includes a three-way valve 112 which can be opened to allow the respective component to pass out of the closed circuit towards a junction point 113. Fluorocarbon refrigerant in liquid form is displaced from a cylinder 114 by means of nitrogen gas cylinder 115 through a flowmeter 116 to the junction point 113. The isocyanate and resin components, with fluorocarbon, all in liquid form, then proceed from the junction point 113 to mixing units 118, 119, disposed in series, each of which comprises a long cylinder with internal baffes.

From the mixing units 118, 119, the mixture, still in liquid form, passes a control valve 121 and a pressure gauge 122 into a multi-stage pressure let-down chamber designated generally 123. This chamber 123 comprises a cylinder 124 with five orifice plates 125, 126, 127, 128, 129 of progressively increasing orifice size. In the chamber 123 the fluorocarbon gasifies to form bubbles in the resin-isocyanate mixture, which issues from the chamber 123 past a pressure gauge 131 and a pressure control valve 132. The valve 132 can be connected direct to a mould in which the foam is to be placed. The apparatus is equipped with tank heater elements, line heaters and temperature and pressure cut-out units, none of which is shown. A control and display unit 135 senses the temperatures in the component tanks 101, 102, the associated closed circuits, and the inlet temperature to the pressure let-down chamber 123, and applies heat as required to maintain the predetermined temperatures.

The orifice plates 125–129 in the pressure let-down chamber 123 perform a function similar to the valves B1, B2 in FIG. 3, except that there are more of them and they are not adjustable. The first orifice plate 125 causes the pressure drop that brings about the small-scale gasification establishing the nuclei. A small amount of gasification may, however, take place upstream of the plate 125. Subsequent orifice plates bring about increasing gasification. It is found that a gradual and stable gas formation within the mix is obtained and that with correct choice of the orifice diameters (which can be achieved by a combination of calculation and trial and error), gas blow-out can be avoided. Control of the valves 121, 133 allows for production at a desired rate.

As an example of the manner of working of the FIG. 4 apparatus, assume that a final density of 64 kgm$^{-3}$ (4 lb per cubic foot) is required on foam emerging from the machine at 26.7° C. (80° F.). The initial temperatures required for the resin and isocyanate components to obtain this final temperature are calculated by normal thermodynamic procedure. Empirical test procedure will have previously determined the "critical shear" or the formulation being used as 18%: critical shear is defined as:

$$100 - \left( \frac{x}{x_o} \times 100 \right) q$$

where $x$ = final cell wall thickness
$x_o$ = initial cell wall thickness.

Orifice plate sizing, their number and resultant pressures within the passive let-down chambers are calculated to ensure that at no point in the system is the critical shear exceeded.

With the conditions stated preferred orifice diameters are as follows:

orifice plate 125—orifice diameter 4.4 mm
orifice plate 126—orifice diameter 4.8 mm
orifice plate 127—orifice diameter 6.5 mm
orifice plate 128—orifice diameter 7.5 mm
orifice plate 129—orifice diameter 9.0 mm The corresponding pressures are as follows:

| | | |
|---|---|---|
| Gauge 122 and chamber 141 | 8 | atmospheres |
| chamber 142 | 6.4 | atmospheres |
| chamber 143 | 4.8 | atmospheres |
| chamber 144 | 3.8 | atmospheres |
| chamber 145 | 2.4 | atmospheres |
| Chamber 146 and gauge 131 | 1.5 | atmospheres |

Calculation is based on the following empirically derived formula:

$$h_o = \frac{\alpha}{\rho}\left[\frac{F}{d^2}\left(1 - \frac{d^2}{D^2}\tan\theta\right)^{\frac{1}{2}}\left(1 - \frac{d^4}{D^4}\right)^{\frac{1}{2}}\right]^2$$

where $h_o$ = pressure drop
$\alpha$ = correction factor for orientation performances
F = numerical factor as a function of machine throughput
d = diameter of orifice
D = diameter of approach chamber
$\tan\theta$ = net loss factor gradient
$\rho$ = approach density For example, for the pressure drop $h_o$ at orifice plate 127 d is the diameter of the plate 127 and D that of chamber 143. $\rho$ is the density in chamber 143. $\tan\theta$ represents the proportion of energy lost in passing the orifice, due to actual flow conditions deviating from the ideal. F is determined by throughput and $\alpha$ is a constant depending on the physical arrangement.

In the above, two forms of apparatus have been shown, one with two control valves pre-set to maintain desired pressures and operating with the aid of feedback, and the other where a passive system of orifice plates produces pressure reduction in five stages. It will be appreciated that either the control valves or the orifice plates could vary in number. While a single pressure drop following the formation of nucleating gas bubbles is contemplated, better results are achieved with more stages. With orifice plates a relatively large number of stages can be provided at very little cost. With many stages the process approaches a continuous pressure let-down with continuous absorption of latent heat from the sensible heat of the resin mixture, the heat exchange being substantially adiabatic i.e. without substantial heat transfer to or from the surroundings.

Generally speaking the following statements are applicable:

(i) Density is a function of the amount of fluorocarbon put into the mix.
(ii) The minimum density obtainable is a function of the shear resistance of the viscous mix.
(iii) Shear resistance increases as the mixture approaches its gelation point.
(iv) The lower the density required the more control stages are required to smooth out the gasification rate. The higher the density the fewer the stages become.
(v) A rapid gelation time will allow more fluorocarbon to be introduced to reduce density or allow fewer stages to be used.

The pressure at A2 represents a combination of flash gas pressure and pressure from gas derived by latent heat process.

The interaction of valves B1 and B2 tends to even out pressure fluctuations: the valves control smoothly the amount, rate, and location of gasification, so as to maintain the expansion rate below the critical shear factor appropriate to the elastic response of the chemical formulation in its viscous state, i.e. prevent gas blow-out.

There will now be described the application of the invention to phenolics.

The principles outlined above for the production of a plastic foam, as a fully blown isotropic two phase viscous fluid of predetermined density, at the outlet of the equipment described, apply generally and not only to polyurethane. However, careful attention to the thermodynamics of the process is needed, and also to the characteristics of the plastics material.

For polyurethane, the previous example of plastics material, the mere bringing together of a polyol and an isocyanate at almost any temperature will result in solidification as a function of time.

The time factor involved can be expedited to a predetermined value by the addition of a small but appropriate amount of catalyst. The principal thermodynamic considerations concern density control and the enthalpy requirement to obtain the necessary specific volume of the refrigerant vapor.

With certain plastics, and here phenolics are chosen as the illustrative example, reactivity characteristics call for special attention. With phenolics, all the reactivity is in the resin.

The first point of note is that the temperature of the viscous foam emerging from the apparatus must be chosen with mathematical care rather than just on an arbitrary basis. Too low a temperature and the foam will not set while too high a temperature could result in a very rapid set time and possible post expansion that would result in a less isotropic matrix.

Unlike the polyurethane reaction, that of phenolics requires a second component which is a catalyst, in the form of an acid catalyst; the reaction is highly exothermic.

Figure 5:
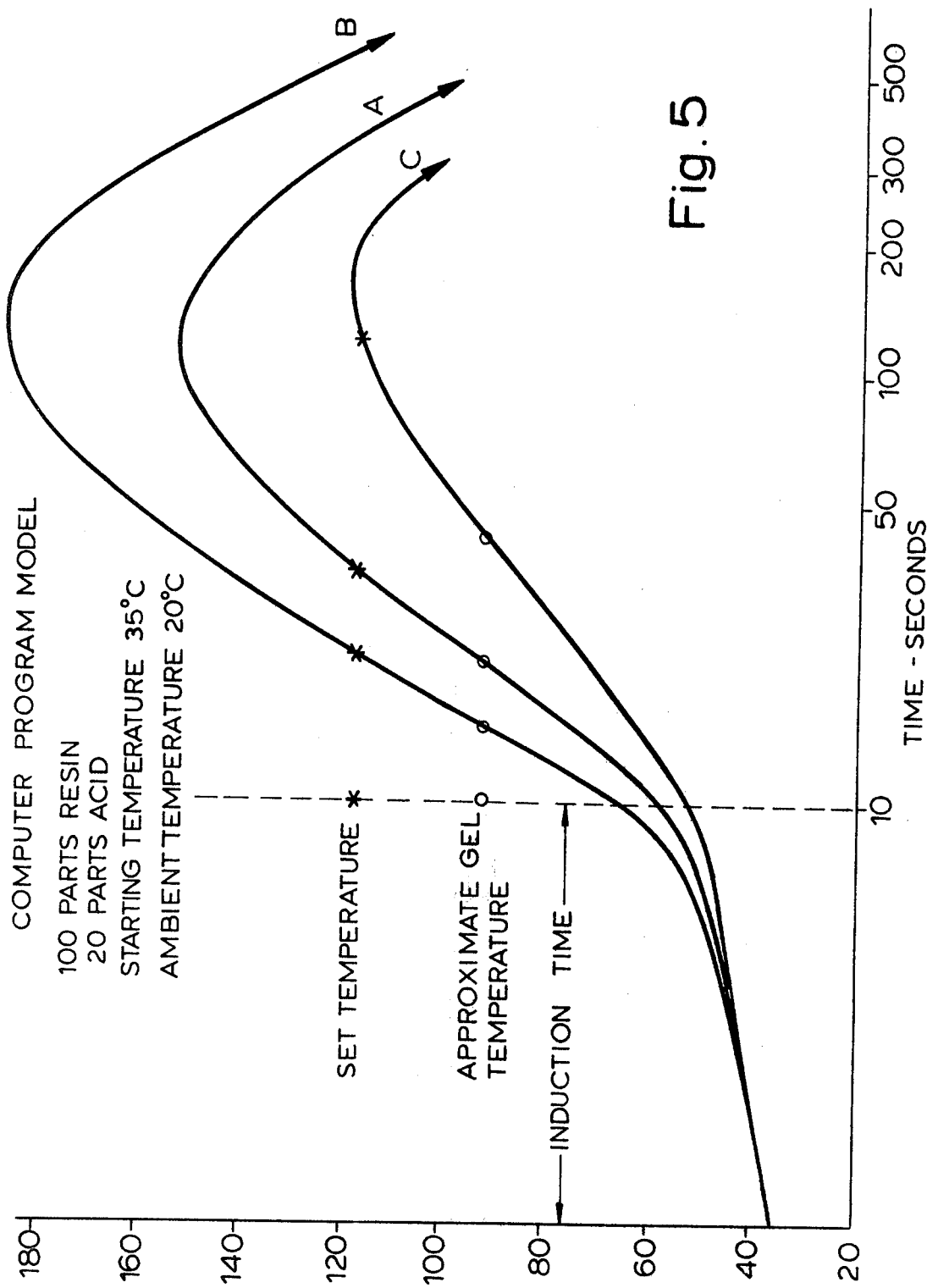
FIG. 5 is a temperature-time graph related to phenolic resin.

FIG. 5 shows typical plots of the effects of reactivity in terms of temperature and time for reaction of a mixture of 100 parts of phenolic resin and 20 parts of acid. The following is to be taken account of in design.

(i) Sufficient exotherm must be assured either by incorporating sufficient acid or by supplementing the effect the acid by higher starting temperatures to ensure that the "set" point temperature will be attained by the reaction.
(ii) True molecular reactivity is also time dependent and therefore mixing of the components and their heating to the desired starting temperature must be duly synchronized otherwise the change from liquid to solid will not take place.
(iii) The actual temperatures attained are the net result of heat gains minus heat loss. Heat loss arises from a function of the process being employed, time factors, product geometry, mass to surface area ratio, and the resultant temperature differentials between product and environmental contacting surfaces.

While pressure drops are substantially adiabatic in the sense that no heat is deliberately added from the surroundings, or removed by them during the expansion process, nevertheless temperature is fairly critical and the factors mentioned must be taken account of.

In FIG. 5 Curve A shows a laboratory test on the phenolic resin reaction mixture specified, with no attempt to produce foam.

The reaction shows an induction time of 10 seconds and a set point at 118° C. reached after 35 seconds. A maximum temperature of 153° C. is reached before the reactivity ends and cooling commences.

Curve B Even under controlled laboratory conditions heat loss from the system is inevitable and Curve B shows Curve A after the appropriate heat loss corrections have been applied. These corrections were obtained from a computer program specially drawn up for the purpose. The resulting plots reflect, to a high degree of accuracy, a picture of the reactivity taking place in terms of temperature and time. From known thermal properties of the components involved the excess in enthalpy generated can be calculated.

Curve C illustrates how the same formulation would react when adapted to the present invention to produce plastics foam. The curve takes account of the effects of real life heat loss factors mentioned at (iii) above.

Testing and computerised modelling enable the appropriate formulation and temperatures to be selected to produce the desired product density. From such considerations the emerging foam temperature referred to above can also be selected.

As already explained, for polyurethanes and plastics with similar polymerisation characteristics, it is sufficient to base the thermodynamic calculation on a desired foam temperature and density at atmospheric pressure.

With phenolics and similar materials, however, where all potential reactivity is within the resin and requires a catalyst to initiate the reaction, the ratio of the resin to catalyst merely determines the time scale before the solid state is reached, providing one important criteria is applied, viz: that an appropriate set of temperatures is achieved during the exothermic reaction. (This discussion will be seen to be an elaboration of the foregoing).

These temperature points in ascending order are (1) gel temperature, (2) set temperature and (3) cure temperature.

(1) The gel point is an observer arbitrary one at which what is known as stringing occurs and is a function of viscoelastic manifestation.

(2) The set temperature is the point at which viscoelasticity reaches the point where cell size reaches its maximum and further expansion due to increased internal pressure arising from increased temperature is not possible.

(3) The cure temperature is the point at which molecular arrangement and cross linkage of the molecular structure reaches its optimum. Provided the set point is reached, cure will inevitably follow.

It will be obvious from the foregoing that with phenolics and similar materials the allocation of an arbitrary foam temperature and density which in turn determines specific volume of the refrigerant vapor is not a satisfactory way to start the design of the foaming process. In order to control density, the mass of refrigerant required in the formulation is a function of the "set point" temperature which now becomes the fixed starting point for the thermodynamic calculations.

There is, however, one further complication associated with set point temperature because, although it is primarily a function of the specific resin that is being used, it is also a function of the density of the foam being produced from that resin. The explanation for this is that set point as well as being a function of viscoelasticity is also a function of the cell wall membrane thickness.

The higher the density of foam being produced, the greater will be the wall membrane thickness both initially and finally, and therefore the greater will be the resistance to all volumetric increase, and therefore the lower will be the set point temperature. The lower the density, the higher the temperature.

Laboratory determination of "set point" applicable to formulation being used and the density required is necessary as a basis for process design.

Finally, whilst "set point" temperature is used to calculate the required refrigerant mass, the normal thermodynamic calculations for phenolics and the like use the starting point temperature in lieu of an arbitrary resultant foam temperature. It will be understood that the starting temperature is also determined from the test which derived the set point.

By way of illustration and using a two-stage pressure let-down system as in FIG. 3 above for the production of 2.5 lb/cu.ft. density phenolic foam, the following become applicable:

| Resin Mass | 100 parts | J25/202L and surfactant, as manufactured by B.P. Chemicals |
|---|---|---|
| Acid Catalyst | 12.5 part | Phencat 14 + HCl. |
| Set point temp. | 176° F. | |
| Starting temp. | 86° F. | |

Thermodynamic considerations call for a chemical liquid mixture temperature of 101° F. which, after vapourisation and superheating the refrigerant vapour, will give a foam starting temperature of 86° F. The refrigerant content based on its specific volume at 176° F. and a foam density of 2.5 lbs/cu.ft. requires 15.74 parts in the formulation.

Referring to the pressure-enthalpy diagram for the refrigerant, the plot across the process can be shown using the values calculated.

Figure 6:
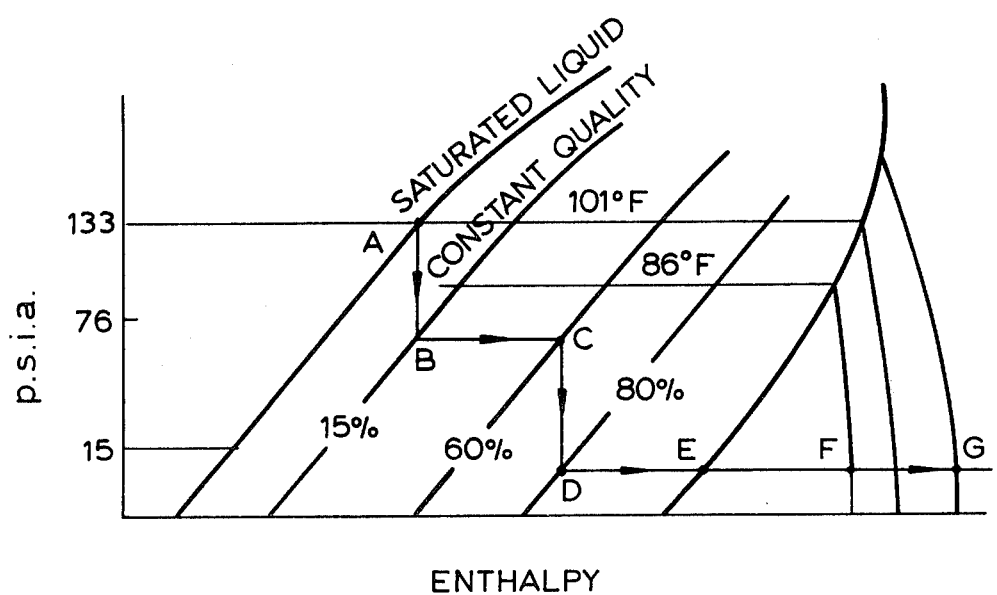
FIG. 6 is a pressure-enthalpy diagram illustrating a process for producing foamed phenolic plastics.

The process follows the following route (See FIG. 6).

Point A. At a mixture temperature of 101° F. the refrigerant properties call for a pressure of 133 p.s.i.a. to maintain it at a liquid state. Setting the pressure at 131–132 will induce vapourisation of a small amount to induce nucleation at the desired location within the machine.

Point B. Follows a first adiabatic pressure drop of 56 p.s.i. and results in flash gas formation of 15% of the refrigerant.

Point C. Follows latent heat of vapourisation of a further 45% of the refrigerant at constant temperature of the refrigerant but a lowering of the resin temperature. The duration of the process and the amount of vapourisation is a function of time between the pressure drops.

Point D. Follows the second adiabatic pressure drop and gives a further 20% flashing of the liquid at atmospheric pressure.

Point E. Follows a taking up of latent heat which completes the vapourisation.

Point F. Superheating to the point where temperature equalisation between vapour and liquid resin is reached.

Point G. Follows further superheating and cell expansion until the set point is reached. This is the temperature on which thermodynamic calculations were based.

At some point between F & G the viscous two-phase fluid emerges from the machine and whilst a very small post-expansion capability still exists, this is insufficient to affect isotropic properties of the foam so produced.

There will be no need to cure the product as it will be already cured when set in its mould or other position of use.

The phenolics process has been described with reference to FIG. 3, but could equally well be performed with the apparatus of FIG. 4.

I claim:

1. A method of forming a pre-froth plastics foam which comprises the steps of:
    mixing the plastics component with a volatile liquid under a pressure sufficient to maintain the volatile liquid in a liquid state;
    causing the mixture to flow to a point of use;
    maintaining in a first region through which the flow passes a first pressure such that at the temperature prevailing a small but effective quantity of the liquid volatilizes to form vapor bubbles providing nuclei;
    causing the flow after passing said first region to undergo a pressure drop to cause volatilization of some but not all of the remaining liquid; and
    maintaining in a second region through which the flow passes after the pressure drop a second pressure lower than the first and allowing volatilization of further liquid in said second region.

2. A method as claimed in claim 1, including the further steps of causing the flow to undergo a second pressure drop to cause further volatilization of volatile liquid, and maintaining in a third region through which the flow passes after the second pressure drop a third pressure lower than the second and allowing volatilization of further liquid in said region.

3. A method as claimed in claim 1 including the further steps of causing the flow to undergo a succession of further pressure drops and maintaining in successive regions through which the flow passes after said pressure drops successively lower pressures, the pressure drops causing volatilization of the volatile liquid and volatilization of further liquid taking place in said regions.

4. A method as claimed in claim 1 in which each pressure drop is obtained by a valve controlled automatically in accordance with a pre-set value and with the pressure in the flow adjacent the valve.

5. A method as claimed in claim 1 wherein each pressure drop is obtained by means of an orifice plate.

6. A method as claimed in claim 5 wherein the pressure drops are obtained by a series of aligned orifice plates within a chamber.

7. In a method of forming a pre-froth polyurethane foam which comprises:
    mixing the resin and isocyanate components with a fluorocarbon refrigerant liquid under a pressure sufficent to maintain the fluorocarbon refrigerant liquid in a liquid state:
    causing the mixture to flow to a point of use;
    the improvement which comprises:
    (a) maintaining in a first region through which the flow passes a first pressure such that at the temperature prevailing a small but effective quantity of fluorocarbon refrigerant volatilizes to form vapor bubbles providing nuclei;
    (b) causing the flow after passing said first region to undergo an adiabatic pressure drop to cause volatilization of some but not all of the remaining fluorocarbon refrigerant liquid; and
    (c) maintaining in a second region through which the flow passes after the pressure drop a second pressure lower than the first and allowing volatilization of further fluorocarbon refrigerant liquid in said second region by reason of the fluorocarbon refrigerant liquid gaining in latent heat from the sensible heat of said resin and isocyanate components.

8. In a method of forming a pre-froth polyurethane foam which comprises:
    mixing the resin and isocyanate components with a fluorocarbon refrigerant liquid under a pressure sufficient to maintain the refrigerant liquid in a liquid state;
    causing the mixture to flow to a point of use;
    the improvement which comprises:
    (a) maintaining in a first region through which the flow passes a first pressure such that at the temperature prevailing a small but effective quantity of the refrigerant volatilizes to form vapor bubbles providing nuclei;
    (b) causing the flow after passing the first region to undergo a succession of adiabatic pressure drops to cause volatilization of some of the remaining refrigerant liquid, each pressure drop being followed by;
    (c) maintaining a further region at a pressure below the previous region in which further refrigerant liquid volatilizes by reason of the refrigerant liquid gaining latent heat form the sensible heat of the plastics components.

9. A method of forming a pre-froth plastics foam which comprises:
    mixing the plastics component with a volatile liquid under a pressure sufficient to maintain the volatile liquid in a liquid state;
    causing the mixture to flow to a point of use;
    maintaining in a first region through which the flow passes a first pressure such that at the temperature prevailing a small but effective quantity of the liquid volatilizes to form vapour bubbles providing nuclei;
    causing the flow after passing said first region to undergo a substantially adiabatic pressure reduction to a second pressure substantially lower than the first pressure to cause volatilization of some but not all of the liquid resulting from the pressure drop and volatilization of further liquid resulting from its absorption of latent heat from the plastics component.

10. A method as claimed in claim 9 wherein the adiabatic pressure reduction is obtained by use of a plurality of orifice plates.

* * * * *